(12) United States Patent
Yang et al.

(10) Patent No.: US 7,761,064 B2
(45) Date of Patent: Jul. 20, 2010

(54) RADIO FREQUENCY MATCHING CONTROL APPARATUS AND METHOD FOR PORTABLE COMMUNICATION TERMINAL

(75) Inventors: Dong-Il Yang, Suwon-si (KR); Chung-Jin Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 623 days.

(21) Appl. No.: 11/784,031

(22) Filed: Apr. 5, 2007

(65) Prior Publication Data

US 2008/0032635 A1 Feb. 7, 2008

(30) Foreign Application Priority Data

Aug. 7, 2006 (KR) ...................... 10-2006-0074205

(51) Int. Cl.
*H01Q 11/12* (2006.01)
*H04B 1/04* (2006.01)
(52) U.S. Cl. .................. 455/121; 455/120; 455/125
(58) Field of Classification Search .............. 455/115.1, 455/126, 127.1, 107, 125, 121, 120, 123; 333/17.1, 17.3, 32
See application file for complete search history.

(56) References Cited

U.S. PATENT DOCUMENTS 5,778,308 A * 7/1998 Sroka et al. ............... 455/115.1

| | | | |
|---|---|---|---|
| 6,236,866 B1 * | 5/2001 | Meyer et al. | 455/562.1 |
| 6,570,462 B2 * | 5/2003 | Edmonson et al. | 333/17.3 |
| 7,586,387 B2 * | 9/2009 | Van Delden | 333/101 |
| 2001/0052868 A1 | 12/2001 | Masuda | |
| 2005/0009482 A1 | 1/2005 | Han | |
| 2005/0237127 A1 | 10/2005 | Van Delden et al. | |

FOREIGN PATENT DOCUMENTS

| | | |
|---|---|---|
| CN | 1204895 | 1/1999 |
| CN | 1578166 | 2/2005 |
| KR | 1020050034170 | 4/2005 |
| KR | 1020050094695 | 9/2005 |
| KR | 1020060042483 | 5/2006 |
| KR | 1020060074515 | 7/2006 |

* cited by examiner

*Primary Examiner*—Sonny Trinh
(74) *Attorney, Agent, or Firm*—The Farrell Law Firm, LLP

(57) ABSTRACT

A radio frequency (RF) matching control apparatus and method for a portable communication terminal is provided. An RF matching control apparatus for a portable communication terminal according to the present invention includes matching circuitry for performing RF matching on an RF signal input through an input line connected to an antenna and outputting a matched RF signal through an output line; and a decoding unit for generating matching control signals according to a utilization environment of the portable communication terminal and providing the matching control signals to the matching circuitry.

18 Claims, 2 Drawing Sheets

RADIO FREQUENCY MATCHING CONTROL APPARATUS AND METHOD FOR PORTABLE COMMUNICATION TERMINAL

PRIORITY

This application claims priority to an application entitled "RADIO FREQUENCY MATCHING CONTROL APPARATUS AND METHOD FOR PORTABLE COMMUNICATION TERMINAL" filed in the Korean Intellectual Property Office on Aug. 7, 2006 and assigned Serial No. 2006-0074205, the contents of which are incorporated herein by reference.

BACKGROUND OF THE INVENTION

1. Field of the Invention

The present invention relates to a portable communication terminal and, in particular, to an Radio Frequency (RF) matching control apparatus and method for a portable communication terminal.

2. Description of the Related Art

Typically, a portable communication terminal is implemented so as to optimize a radiation characteristic. In the case of using a single RF matching circuit, the portable communication terminal inevitably suffers from degradations in reception sensitivity and transmission power due to the radiation characteristic variation in accordance with the change of channel environment.

In order to solve such problems, a multiple RF matching circuits-based portable communication terminal has been proposed. In the multiple RF matching circuits-based portable communication terminal, each RF matching circuit should be implemented with resistors, inductors, and capacitors, having preset resistances, inductances, and capacitances, respectively. That is, the values of the elements constituting each RF matching circuit are fixed in the manufacturing stage and each RF matching circuit operates independently.

However, the conventional multiple RF matching circuits-based portable communication terminal is disadvantageous in that the increase in the number of the RF matching circuits requires additional space, resulting in difficulty of compact design.

Further, the limited number of the RF matching circuits causes limitation of RF tuning performance of the portable communication terminal.

SUMMARY OF THE INVENTION

The present invention has been made in an effort to solve the above problems, and it is an object of the present invention to provide an RF matching control apparatus and method for a portable communication terminal that are capable of optimizing a reception sensitivity and a transmission power.

It is another object of the present invention to provide an RF matching control apparatus and method for a portable communication terminal that are capable of setting a RF matching circuitry adaptive to the environment of the portable communication terminal by configuring a plurality of matching circuits constituting the RF matching circuitry in a software-supported manner.

In accordance with an aspect of the present invention, the above and other objects can be accomplished by a Radio Frequency (RF) matching control apparatus for a portable communication terminal. The RF matching control apparatus for a portable communication terminal includes matching circuitry for performing RF matching on an RF signal input through an antenna and outputting a matched RF signal through an output line; and a decoding unit for generating matching control signals according to an environment of the portable communication terminal and providing the matching control signals to the matching circuitry.

Preferably, each matching circuit includes a matching device, and a switch arranged at an input line and a switch arranged at an output line of the matching device. Preferably, the decoding unit includes a decoder for generating a 16-bit matching control signal from a 4-bit condition signal preset according to the environment of the portable communication terminal; a buffer for temporarily storing the 16-bit matching control signal; and a strobe terminal that inputs a strobe signal for updating the 16-bit matching control signal stored in the buffer.

In accordance with another aspect of the present invention, the above and other objects can be accomplished by a Radio Frequency (RF) matching control method of a portable communication terminal including RF matching circuitry for performing RF matching on RF signal received through an antenna and outputting a matched RF signal through an output line. The RF matching control method includes generating a matching control signal according to an environment of the portable communication terminal; selecting at least one among a plurality of matching circuits constituting the RF matching circuitry; and performing matching on the received RF signal using the selected matching circuit.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and described herein in detail, with the understanding that the present disclosure is to be considered as an exemplification of the principles of the invention and is not intended to limit the invention to the specific embodiments illustrated.

The RF matching circuitry according to the present invention includes at least one unit cell. The unit cell includes at least two matching circuits including resistors, inductors, and capacitors of different values. In this embodiment, the RF matching circuitry includes 2 stepwise unit cells and each unit cell includes 8 matching circuits. However, the quantity of the unit cells and of the matching circuits per unit cell can be changed.

Figure 1:
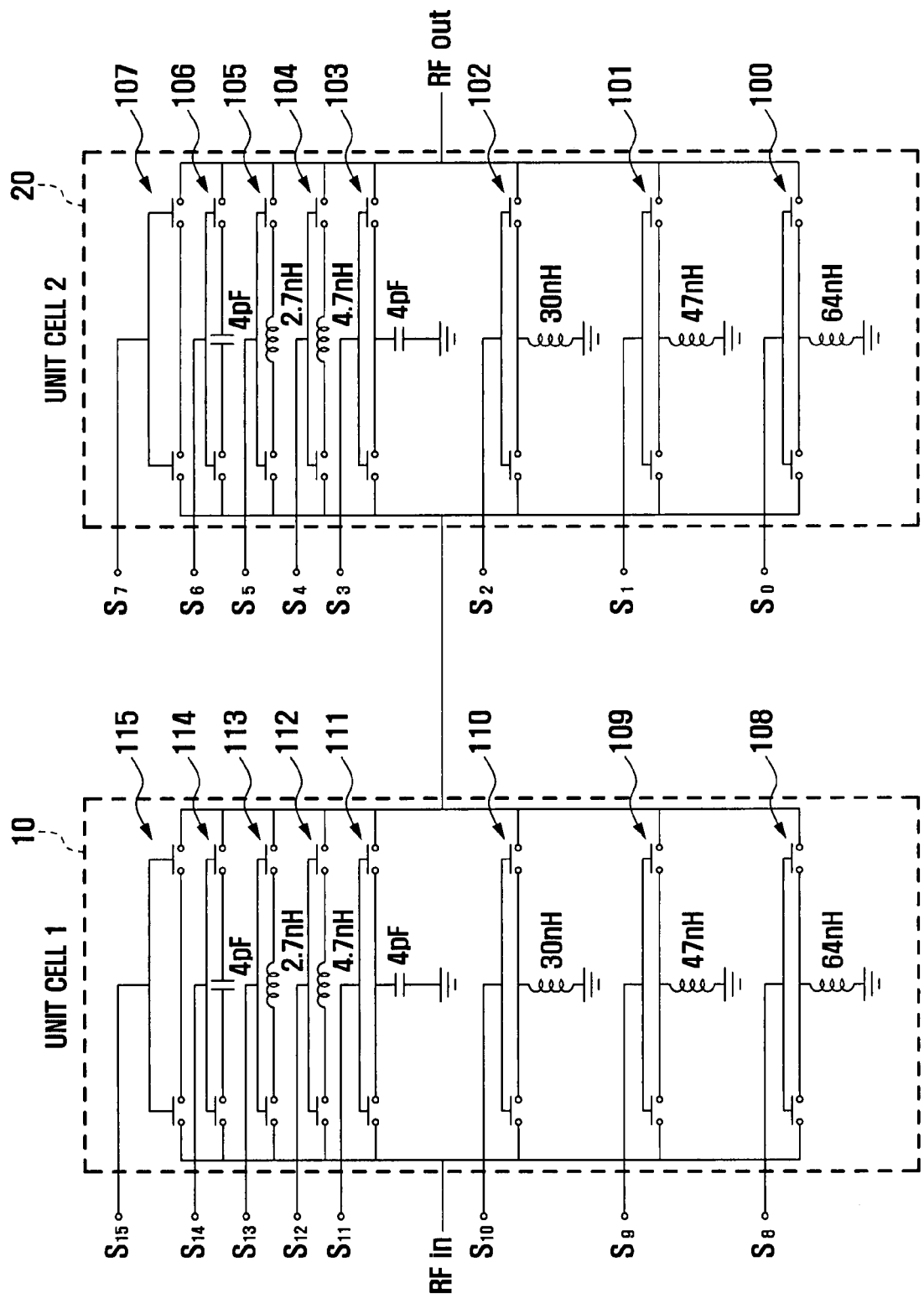
FIG. 1 is a circuit diagram illustrating RF matching circuitry of a portable communication terminal according to the present invention.

Referring to FIG. 1, an RF matching circuitry 3 includes first and second unit cells 10 and 20 connected in series between a radio frequency input terminal (RF in) connected to an antenna (not shown) and a radio frequency output terminal (RF out), for matching a radio frequency signal received through the radio frequency input terminal (RF in) and transferring the matched radio frequency signal to the radio frequency output terminal (RF out).

First and second unit cells 10 and 20 each include devices such as resistors, inductors, and capacitors connected in series or parallel with each other. First unit cell 10 includes matching circuits 108, 109, 110, 111, 112, 113, 114, and 115 interposed in parallel between the radio frequency input terminal (RF in) and the second unit cell 20, and the second unit cell 20 includes matching circuits 100, 101, 102, 103, 104, 105, 106, and 107 interposed in parallel between the first unit cell 10 and the radio frequency output terminal (RF out).

Matching circuit 108 includes a grounded 64 nH inductor, Matching circuit 109 includes a grounded 47 nH inductor, and tenth matching circuit 110 includes a grounded 30 nh inductor.

Matching circuit 111 includes a grounded 4 pF capacitor, matching circuit 112 includes a 4.7 nH inductor connected in series, matching circuit 113 includes a 2.7 nH inductor connected in series, matching circuit 114 includes a 4 pF capacitor connected in series, and matching circuit 115 includes a resistors connected in series.

Matching circuit 100 includes a grounded 64 nH inductor, matching circuit 101 includes a grounded 47 nH inductor, and matching circuit 102 includes a grounded 30 nH inductor.

Matching circuit 103 includes a grounded 4 pF capacitor, matching circuit 104 includes a 4.7 nH inductor connected in series, matching circuit 105 includes a 2.7 nH inductor connected in series, matching circuit 106 includes a 4 pF capacitor connected in series, and matching circuit 107 includes a resistor connected in series.

Figure 2:
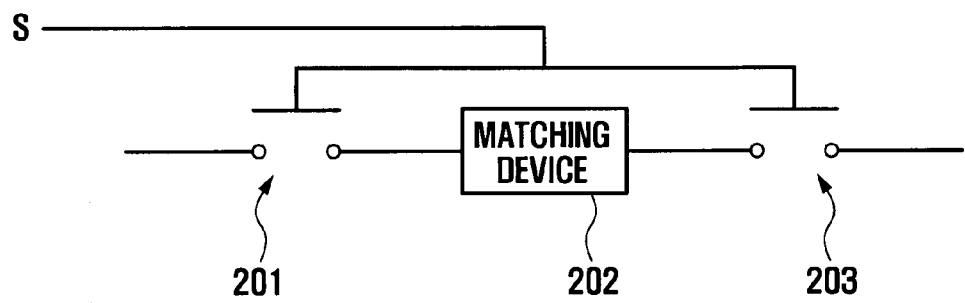
FIG. 2 is a schematic view illustrating a configuration of a matching circuit of FIG. 1.

In FIG. 2, each matching circuit includes at least one matching device 202 connected between a pair of switches 201 and 203 that are connected to an input terminal and an output terminal of matching device 202, respectively.

Matching device 202 can be a resistor, an inductor, or a capacitor. Switches 201 and 203 of each matching circuit are connected to a decoding unit (see FIG. 3).

Figure 3:
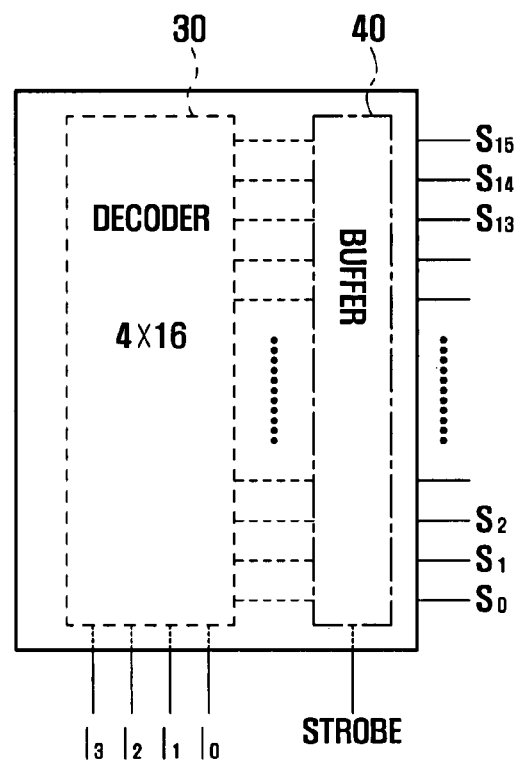
FIG. 3 is a block diagram illustrating a decoding unit for providing control signals to first and second unit cells of FIG. 1.

Referring to FIG. 3, decoding unit 5 includes a decoder 30 and a buffer 40. Decoder 30 generates the control signals for controlling switches 201 and 203 connected to the input and output terminals, respectively, of matching device 202. Accordingly, the decoder is preferably implemented as a 4*16 decoder in consideration of the RF matching circuitry of FIG. 1.

As described above, RF matching circuitry 3 includes two unit cells 10 and 20, each unit cell including 8 matching circuits, such that decoder 30 generates control signals for selecting one matching circuit from each of first and second unit cells 10 and 20.

Referring to FIG. 3, decoding unit 5 includes a decoder 30 that generates condition values for selecting matching circuits according to an environment of the portable communication terminal, and a buffer 40 for temporarily storing the condition values generated by decoder 30. The condition values stored in buffer 40 are updated by a signal input through a strobe terminal.

Referring to FIGS. 1 to 3, matching circuits 100 to 115 are connected to buffer 40 of decoding unit 5 through respective signal lines, and each of switches 201 and 203 installed at the input and output terminals of each matching device 202 is either on or off simultaneously according to the state of buffer 40.

Since the RF matching circuitry of the present invention operates according to the condition values determined by the environment of the portable communication terminal, it is possible to optimize the RF matching adaptively to the environment.

For example, during power-on, the portable communication terminal initializes buffer 40. The initial value is '0000' and the strobe is in a deactivated state by a pull-up resistance. The number of cases of 4 condition values is 16 and can be represented as in Table 1. If a 4 bit-value is input to decoding unit 5, 16 unique status values are output such that the switches are turned on and off according to the corresponding status values.

TABLE 1

| Select (I3, I2, I1, I0) | Buffer Output (S15~S8) | (S7~S0) | Matching Circuit |
|---|---|---|---|
| 0000 | 1000 0000 | 1000 0000 | Serial 0 ohm + Serial 0 ohm |
| 0001 | 0100 0000 | 1000 0000 | Serial 4 pF + Serial 0 ohm |
| 0010 | 0100 0000 | 0100 0000 | Serial 4 pF + Serial 4 pF |
| 0011 | 0100 0000 | 0010 0000 | Serial 4 pF + Serial 2.7 nH |
| 0100 | 0100 0000 | 0001 0000 | Serial 4 pF + Serial 4.7 nH |
| 0101 | 0100 0000 | 0000 1000 | Serial 4 pF + Parallel 4 pF |
| 0110 | 0100 0000 | 0000 0100 | Serial 4 pF + Parallel 30 nH |
| 0111 | 0100 0000 | 0000 0010 | Serial 4 pF + Parallel 47 nH |
| 1000 | 0100 0000 | 0000 0001 | Serial 4 pF + Parallel 64 nH |
| 1001 | 0010 0000 | 0000 1000 | Serial 2.7 nH + Parallel 4 pF |
| 1010 | 0010 0000 | 0000 0100 | Serial 2.7 nH + Parallel 30 nH |
| 1011 | 0010 0000 | 0000 0010 | Serial 2.7 nH + Parallel 47 nH |
| 1100 | 0001 0000 | 0000 1000 | Serial 4.7 nH + Parallel 4 pF |
| 1101 | 0001 0000 | 0000 0100 | Serial 4.7 nH + Parallel 30 nH |
| 1110 | 0001 0000 | 0000 0010 | Serial 4.7 nH + Parallel 47 nH |
| 1111 | 0000 1000 | 0000 0100 | Parallel 4 pF + Parallel 30 nH |

In the present invention, the condition values are determined according to variations in the environment of the portable communication terminal. For example, when a folder of the portable communication terminal is opened or closed (or a slide body is moved up or down) the portable communication terminal retrieves values corresponding to the status of the folder or the slide body from a condition value table. The condition values are predetermined as shown in Table 2.

TABLE 2

| Environment and Status of the Portable Communication Terminal | Condition value |
|---|---|
| Folder open | 0001 |
| Folder close | 0011 |
| Folder open & High channel | 0100 |
| Folder open & Low channel | 0111 |
| Folder close & High channel | 0101 |
| Folder close & Low channel | 0110 |
| Folder open & Tx low power | 0111 |
| Folder close & Tx low power | 0110 |
| Folder open & Rx low power | 0100 |
| Folder close & Rx low power | 0101 |
| Folder open & ear jack insertion | 1001 |
| Folder close & ear jack insertion | 1011 |

Buffer 40 of the decoding unit 5 is updated by an MSM of the portable communication terminal transmitting a strobe value from 'high' to 'low'.

According to the environment of the portable communication terminal, the condition value is automatically selected in a software supported manner and the strobe is activated such that the RF matching is controlled according to the condition value, resulting in optimization of the reception sensitivity and transmission power.

As described above, the RF matching circuitry and method of the present invention can be implemented in the form of a universal integrated chip (IC) and can operate adaptively with respect to the environment of a portable communication terminal, whereby it is possible to improve transmission and reception characteristics and prevent the reception sensitivity from degradation by influence of a human body in a weak electric field.

Also, the RF matching circuitry of the present invention can be tuned to operate such that the reception sensitivity is developed relative to the transmission power in a weak receive electric field and the transmission power increases relative to the reception sensitivity in a weak transmit electric field.

Also, the RF matching circuitry of the present invention can effectively manage the transmission power adaptively to the utilization environment of the portable communication terminal, resulting in an increase of battery life.

Also, the RF matching circuitry of the present invention can tune the RF matching characteristics in a software-supported manner, whereby it is possible to reduce the time and labor for developing a matching circuit for obtaining a specific radiation characteristic.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as further defined in the appended claims.

What is claimed is:

1. A Radio Frequency (RF) matching control apparatus for a portable communication terminal, comprising:
    matching circuitry for performing RF matching on an RF signal input through an antenna and outputting a matched RF signal; and
    a decoding unit for generating matching control signals according to an environment of the portable communication terminal and providing the matching control signals to the matching circuitry,
    wherein the decoding unit comprises:
    a decoder for generating the matching control signals from a condition signal preset according to the environment of the portable communication terminal;
    a buffer for temporarily storing the matching control signals; and
    a strobe terminal that inputs a strobe signal for updating the matching control signals stored in the buffer.

2. The RF matching control apparatus of claim 1, wherein the matching circuitry is connected with the decoding unit through a plurality of parallel signal lines.

3. The RF matching control apparatus of claim 1, wherein the matching circuitry includes a first matching unit and a second matching unit connected in series.

4. The RF matching control apparatus of claim 3, wherein the first and second matching units are connected with the decoding units through a plurality of signal lines.

5. The RF matching control apparatus of claim 3, wherein the first and second matching units each include a plurality of matching circuits.

6. The RF matching control apparatus of claim 5, wherein the matching circuits are connected with the decoding unit.

7. The RF matching control apparatus of claim 6, wherein each matching circuit includes a matching device, and a switch arranged at an input line and a switch arranged at an output line of the matching device.

8. The RF matching control apparatus of claim 7, wherein the switches are each on or off according to matching circuitry control signals.

9. The RF matching control apparatus of claim 3, wherein the first and second matching units each include at least two matching circuits.

10. The RF matching control apparatus of claim 3, wherein the first and second matching units each include 8 matching circuits.

11. The RF matching control apparatus of claim 10, wherein the matching circuits are connected with the decoding unit.

12. The RF matching control apparatus of claim 11, wherein each matching circuit includes a matching device, and a switch arranged at an input line and a switch arranged at an output line of the matching device.

13. The RF matching control apparatus of claim 12, wherein the switches are each on or off according to matching circuitry control signals.

14. The RF matching control apparatus of claim 3, wherein the matching control signals are 16-bit signals and the condition control signal is 4-bit signal.

15. The RF matching control apparatus of claim 14, wherein the first and second matching units each include at least two matching circuits.

16. The RF matching control apparatus of claim 15, wherein each matching circuit includes a matching device, and a switch arranged at an input line and a switch arranged at an output line of the matching device.

17. The RF matching control apparatus of claim 16, wherein the switches are each on or off according to the matching control signals.

18. A radio frequency (RF) matching control method of a portable communication terminal having RF matching circuitry for performing RF matching on an RF signal received through an input line connected to an antenna and outputting a matched RF signal through an output line, comprising:
    generating a matching control signal according to an environment of the portable communication terminal;
    selecting at least one among a plurality of matching circuits constituting the RF matching circuitry; and
    performing matching on the received RF signal using the selected matching circuit,
    wherein generating the matching control signal includes:
    generating, by a decoder, the matching control signal from a condition signal preset according to the environment of the portable communication terminal;
    temporarily storing, by a buffer, the matching control signal; and
    inputting, by a strobe terminal, a strobe signal for updating the matching control signal stored in the buffer.

* * * * *